United States Patent [19]
Landry et al.

[11] Patent Number: 6,027,781
[45] Date of Patent: Feb. 22, 2000

[54] PROTECTIVE COVER FOR AN AUTOMOTIVE CARPET MAT

[76] Inventors: Thomas G Landry, 160 Keonekai Rd., #f 13-105; Raymond N Williams, 160 Keonekai Rd., # 13-106, both of Kihei, Hi. 96753

[21] Appl. No.: 08/998,510

[22] Filed: Dec. 27, 1997

[51] Int. Cl.⁷ .................................................. B62D 25/20
[52] U.S. Cl. ................... 428/40.1; 296/97.23; 428/42.1; 428/88; 428/99; 428/192
[58] Field of Search .................. 428/40.1, 42.1, 428/192, 88, 99; 296/97.23

[56] References Cited

U.S. PATENT DOCUMENTS

| | | |
|---|---|---|
| 4,211,447 | 7/1980 | DiVincenzo .............................. 296/1 F |
| 4,399,176 | 8/1983 | Bell et al. .................................. 428/85 |
| 4,420,180 | 12/1983 | DuPomt et al. ......................... 296/1 F |
| 4,435,451 | 3/1984 | Neubert ...................................... 428/95 |
| 4,968,548 | 11/1990 | Gibson et al. ............................ 428/95 |
| 5,683,780 | 11/1997 | Rodger ....................................... 428/95 |
| 5,725,926 | 3/1998 | Wang ........................................ 428/95 |
| 5,891,546 | 4/1999 | Sherman ................................... 428/95 |

*Primary Examiner*—Nasser Ahmad
*Attorney, Agent, or Firm*—Michael I. Kroll

[57] ABSTRACT

A protective cover (12) for an automotive carpet mat (14) comprising a shallow tray (16) sized and shaped to extend completely over the automotive carpet mat (14). An assembly (18) is for securing the shallow tray (16) in a hermetically sealed manner to the automotive carpet mat (14), so as to preserve the automotive carpet mat (14) from dirt, wear and tear, to keep moisture out and prevent mildew, while holding mud, sand and liquid spills within the shallow tray (16) from reaching the automotive carpet mat (14) when placed upon a floor (20), in a trunk and in a cargo area of a motor vehicle (22).

13 Claims, 11 Drawing Sheets

PROTECTIVE COVER FOR AN AUTOMOTIVE CARPET MAT

BACKGROUND OF THE INVENTION

1. Field of the Invention

The instant invention relates generally to motor vehicle floor mats and more specifically it relates to a protective cover for an automotive carpet mat. The protective cover for an automotive carpet mat is tailor made to fit any automotive carpet mat used on a floor, in a trunk or in a cargo area, to preserve the automotive carpet mat from dirt, wear and tear. The protective cover for an automotive carpet mat also snugly fits over the automotive carpet mat in a hermetically sealed manner, to keep moisture out and prevent mildew.

2. Description of the Prior Art

Numerous motor vehicle floor mats have been provided in prior art. For example, U.S. Pat. No. 4,211,447 to DiVincenzo; U.S. Pat. No. 4,399,176 to Bell et al.; U.S. Pat. No. 4,420,180 to Dupont et al. and U.S. Pat. No. 4,968,548 to Gibson et al. all are illustrative of such prior art. While these units may be suitable for the particular purpose to which they address, they would not be as suitable for the purposes of the present invention as heretofore described.

DiVINCENZO, JOSEPH

CAR FLOOR TRAY

U.S. Pat. No. 4,211,447

A car floor tray including a perforated floor portion for receiving the footwear of a vehicle occupant. A tray portion underlies the perforated floor portion for receiving liquid which drains through the floor portion. A compartment is in communication with the tray for receiving absorbent material for absorbing liquid which drains into the compartment from the tray. Selectively replaceable absorbent material is in the compartment.

BELL, TED A.

LEHNER, DANIEL F.

AUTOMOTIVE FLOOR MAT HAVING RIGID RIB

U.S. Pat. No. 4,399,176

A floor mat for an automotive vehicle is provided having a relatively thin, flexible sheet-form main body and a rigidifying rib structure formed with or secured thereto in fixed relationship. The rigidifying rib structure is fabricated from or formed by elongated elements that are effectively rigid and thereby render the otherwise flexible main body essentially inflexible. The materials selected to form the rib structure preferably have a resilient characteristic, such as spring steel wire rod, to enhance the mat's ability to maintain itself in a desired smooth, flat configuration on a vehicle's floor. The rib structure is of a configuration to rigidify the main body in two generally perpendicular directions to resist displacement in all directions through the essential rigid rib encountering of any obstructions associated with the vehicle floor and the resilient characteristic of the rib accommodating excessive displacing forces and tending to return the main body of the mat to its original configuration. The rib elements may be rod-like elements or flat strips either integrally embedded in or formed with the sheet-form main body or they may be mechanically secured thereto.

DUPONT, ANDRE

LAURENT, PAUL

BEAUJARDIN, BERNARD

AUTOMOBILE FLOOR MAT WITH MOISTURE COLLECTING FEATURE

U.S. Pat. No. 4,420,180

The floor mat comprises a main portion for lying flat on an automobile floor and an upwardly inclined portion for lying on an inclined surface within the automobile, such as behind the pedals. The main portion includes a centrally disposed downwardly recessed area forming a pan having a floor and surrounding sides for catching fluid. A plurality of ridges, having a triangular cross section, rise vertically from the floor of the pan for holding pants and the like above fluids caught in the pan. The forwardly extending portion includes ribs which extend in the longitudinal direction of the mat for channeling fluids backward into the pan. Additional ribs are formed on the forward portion which are inclined downwardly and inwardly for channeling fluid away from the edges of the mat toward the center of the mat.

GIBSON, WILLIAM E.

GIBSON, SIGRID

REMOVABLE FLOOR COVER FOR RECREATIONAL VEHICLES

U.S. Pat. No. 4,968,548

A removable floor cover formed of one or more sections of a durable fabric is installed over the existing floor or carpet areas of a recreational vehicle to protect the existing floor or carpet from dirt and wear. A plurality of strips of a fabric type hook and loop fastener are secured onto the underside of the floor cover in spaced relation positioned inwardly from and parallel to the peripheral edges of the cover and the peripheral edges outward of the fasteners are folded upward to reside against one or more walls of the area being covered. In carpeted areas, the fastener hook elements are releasably engaged with the fibers of the existing carpet when the cover is pressed thereon to maintain the cover on the carpeted area. In un-carpeted areas, a plurality of strips of the mating loop element of the fastener are secured onto the floor surface inwardly and closely adjacent to at least one wall of the floor area covered and positioned to correspond with the strips of the hook elements at the peripheral edges of the floor cover, whereby the hook elements are releasably engaged with the loop elements to maintain the cover on the floor surface. The cover may be made in several overlapping sections with additional strips of the fastener elements secured on the underside of the cover and/or the floor at selected locations to maintain the cover on the floor or carpeted area.

SUMMARY OF THE INVENTION

A primary object of the present invention is to provide a protective cover for an automotive carpet mat that will overcome the shortcomings of the prior art devices.

Another object is to provide a protective cover for an automotive carpet mat that is tailor made to fit each measurement and dimension of any automotive carpet mat used on a floor, in a trunk or in a cargo area, so as to preserve the automotive carpet mat from dirt, wear and tear.

An additional object is to provide a protective cover for an automotive carpet mat that snugly fits over the automotive carpet mat in a hermetically sealed manner to keep moisture out and prevent mildew, while eliminating mud, sand and liquid spills from reaching the automotive carpet mat.

An important additional object of the present invention is to protect an automotive mat without detracting from the original look.

A further object is to provide a protective cover for an automotive carpet mat that is simple and easy to use.

A still further object is to provide a protective cover for an automotive carpet mat that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DESCRIPTION OF THE PREFERRED EMBODIMENTS

Figure 1:
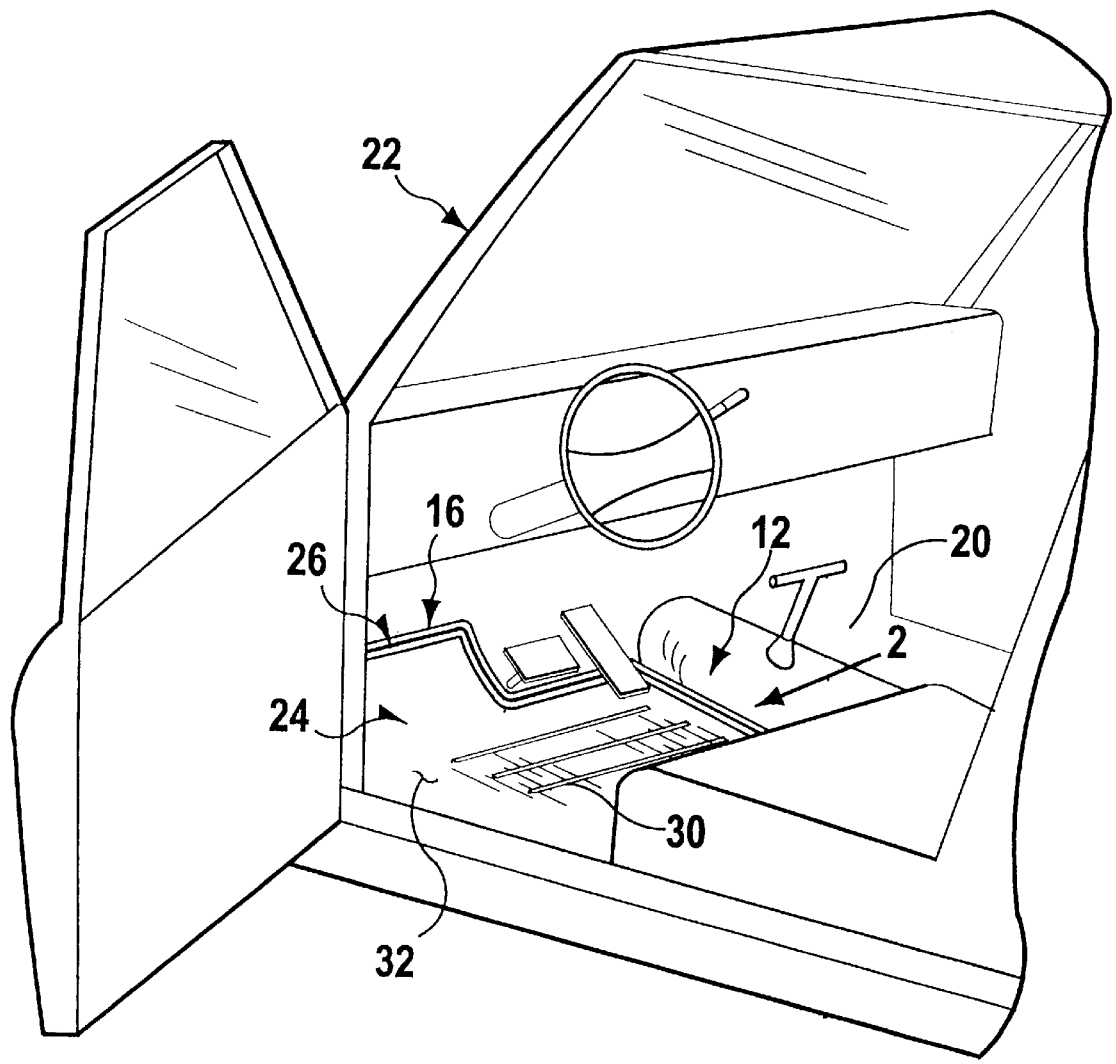
FIG. 1 is a top perspective view of a first embodiment of the present invention in use, with an automotive carpet mat on the driver's slide floor in a motor vehicle.

Turning now descriptively to the drawings, in which similar reference characters denote similar elements throughtout the several views, FIGS. 1 through 11 illustrate the present invention being a protective cover for an automotive carpet mat 14. With regard to the reference numerals used, the following numbering is used throughout the various drawing figures.

12 protective cover for 14
14 automotive carpet mat
16 shallow tray of 12
18 securing assembly of 12 to 14
20 floor in 22
22 motor vehicle
24 flat base portion of 16
26 short wall portion of 16
28 periphery of 24
30 raised traction thread ridge on 32
32 top surface of 24
34 bottom flap of 18
36 edge of 14
38 adhesive layer of 18 on 34
40 removable paper strip of 18 on 38
42 optically clear pliable waterproof durable material
44 lip on 34
46 platform of 12
48 flexible flat plate for 46
50 periphery of 46
52 rib The protective cover 12 for the automotive carpet 14, as shown in FIGS. 1 through 8, comprises a shallow tray 16 sized and shaped to extend completely over the automotive carpet mat 14. An assembly 18 is for securing the shallow tray 16 in a hermetically sealed manner to the automotive carpet mat 14, so as to preserve the automotive carpet mat 14 from dirt, wear and tear, to keep moisture out and prevent mildew, while holding mud, sand and liquid spills within the shallow tray 16 from reaching the automotive carpet mat 14 when placed upon a floor 20, in a trunk and in a cargo area of a motor vehicle 22.

Figure 2:
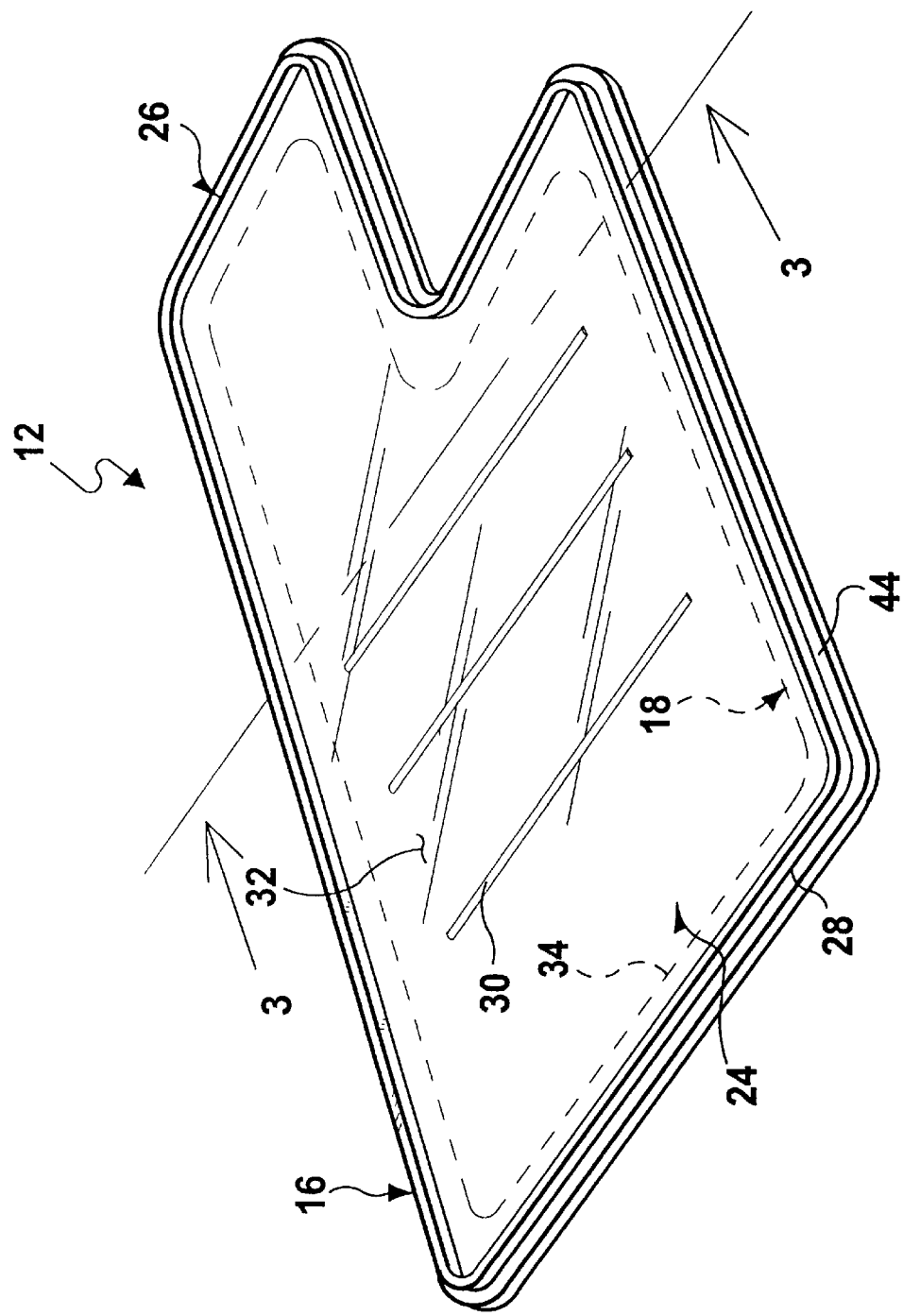
FIG. 2 is an enlarged top perspective view of the first embodiment per se, taken in the direction of arrow 2 in FIG. 1.

The shallow tray 16 includes a flat base portion 24 and a short wall portion 26 integral with and extending upright and continuously adjacent the periphery 28 of the flat base portion 24, to retain the dirt and the liquids therein. As shown in FIGS. 1 and 2, a plurality of raised traction thread ridges 30 can be on a top surface 32 of the flat base portion 24, so that when used on the floor 20 of a driver's side of the motor vehicle 22, the raised traction tread ridges 30 will provide a non-slip area for the driver's shoe heel.

The securing assembly 18 consists of a bottom flap 34 integral with the periphery 28 of the shallow tray 16 and extends inwardly and continuously in a spaced away parallel relationship under a bottom surface of the shallow tray 16, whereby the edges 36 of the automotive carpet mat 14 will be inserted therebetween. An adhesive layer 38 is applied onto a top surface of the bottom flap 34. A removable paper strip 40 on the adhesive layer 38 is peeled off the adhesive layer 38 after the edges 36 of the automotive carpet mat 14 is inserted between the bottom surface of the shallow tray 16 and the top surface of the bottom flap 34.

Figure 3:
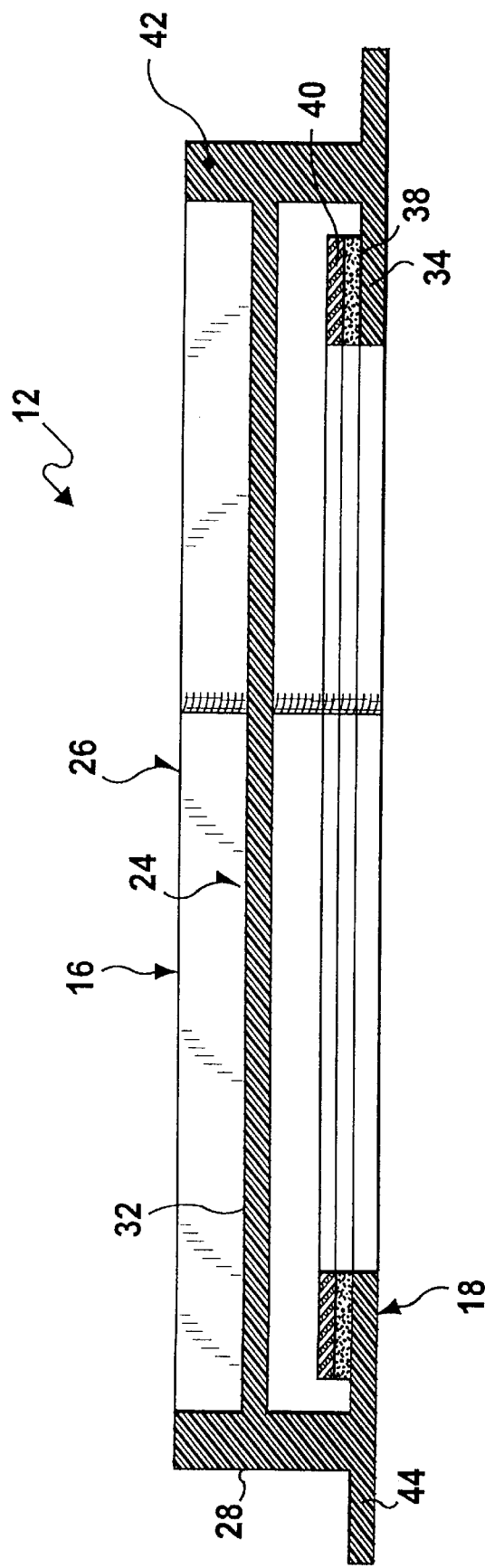
FIG. 3 is a cross sectional view taken along line 3—3 in FIG. 2.
Figure 4:
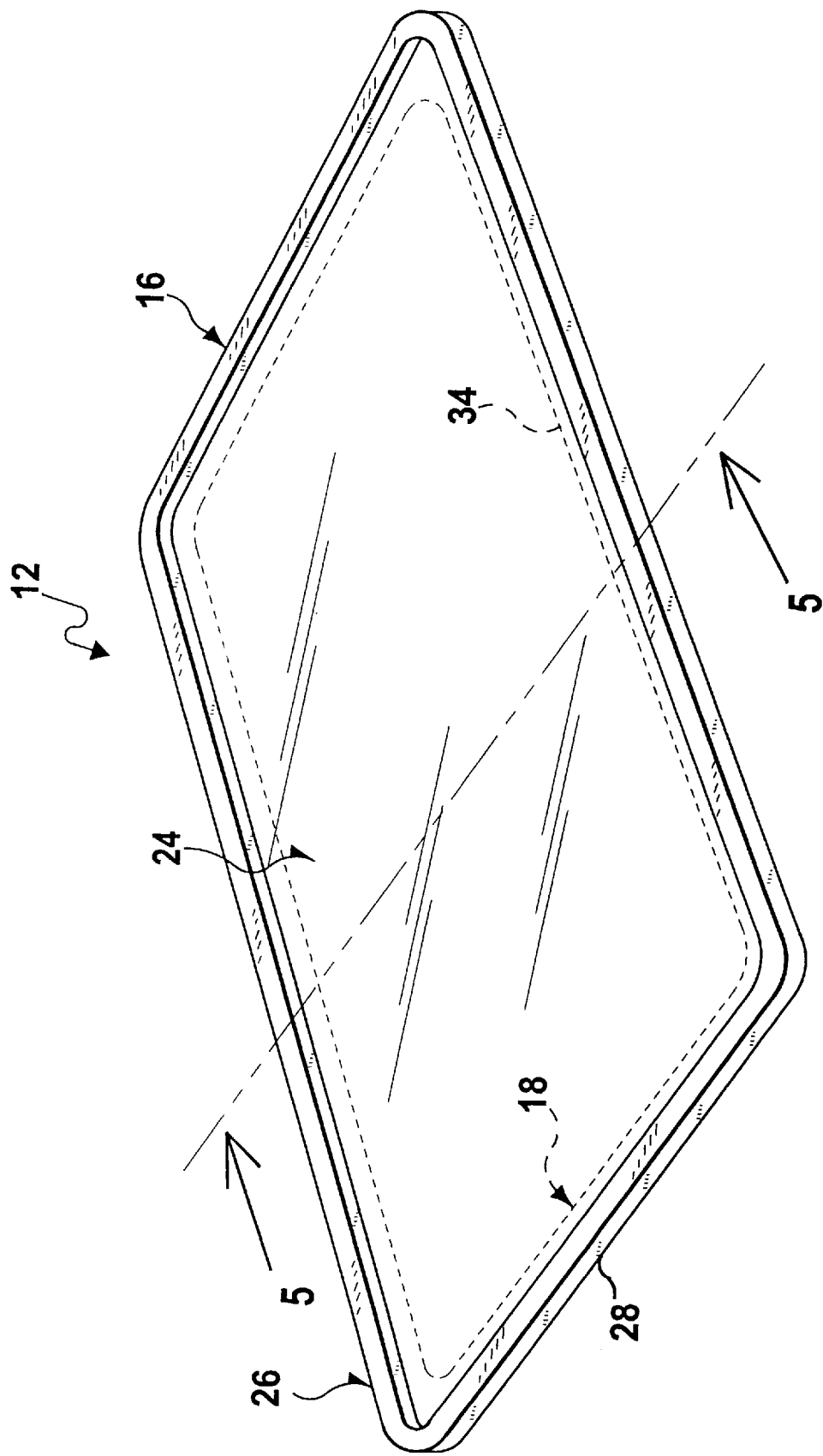
FIG. 4 is a top perspective view of a second embodiment of the present invention to be used in conjunction with a trunk or cargo mat.
Figure 5:
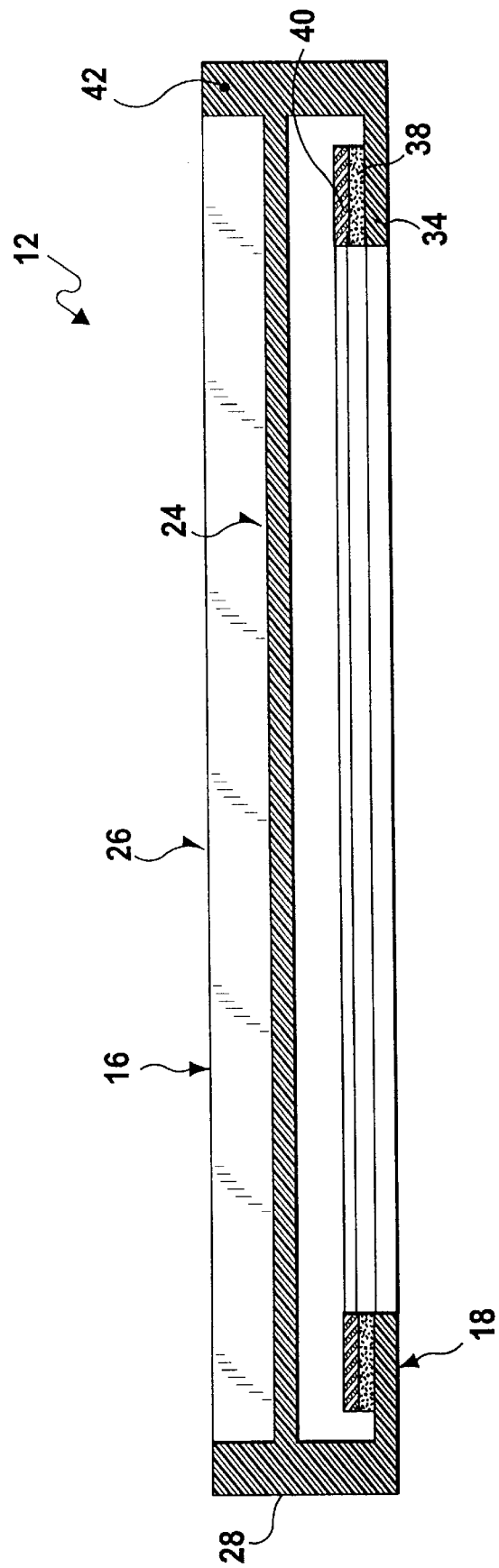
FIG. 5 is a cross sectional view taken along line 5—5 in FIG. 4.
Figure 6:
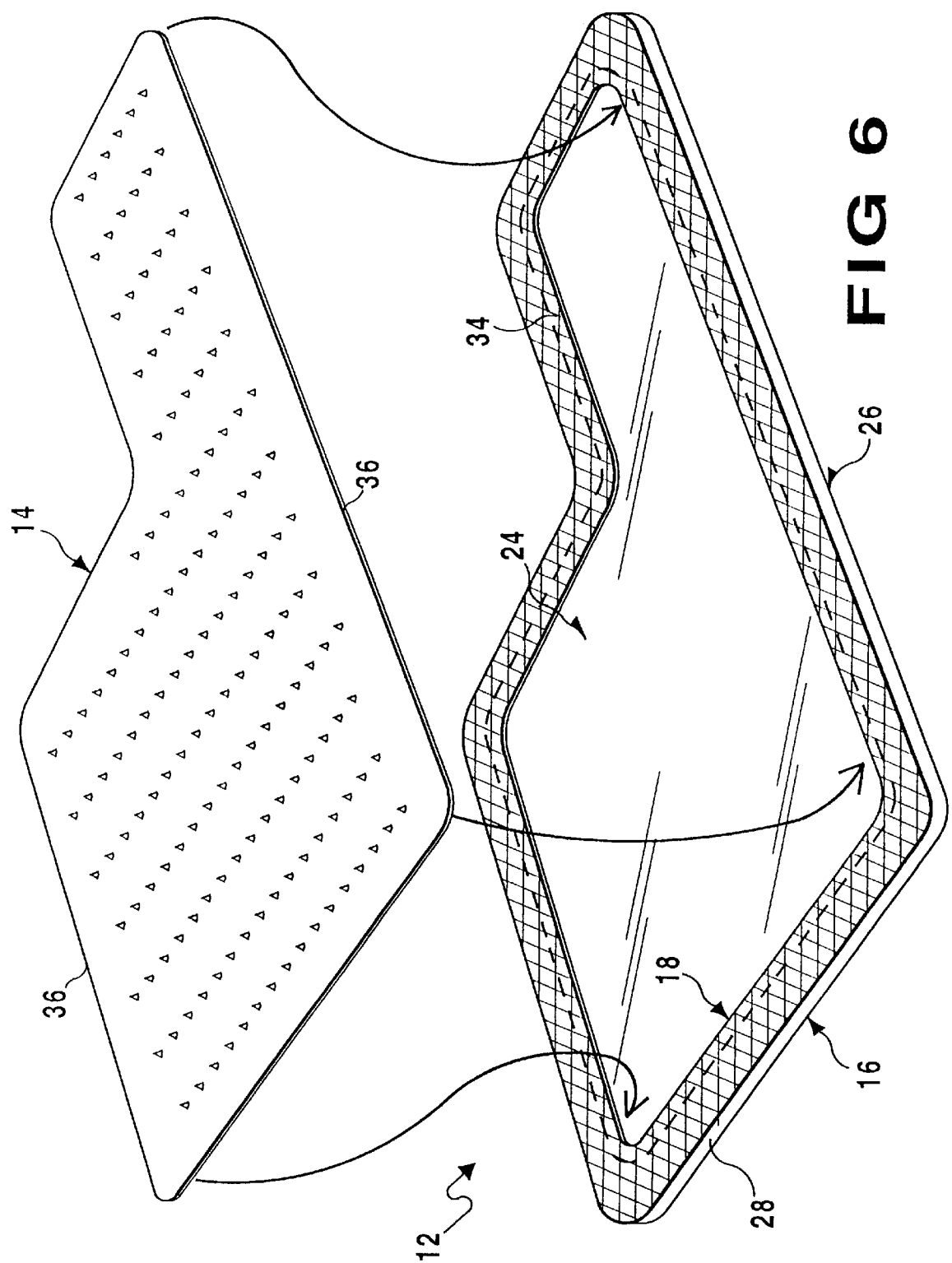
FIG. 6 is a bottom perspective view of the first embodiment, showing the automotive carpet mat ready to be inserted into the bottom flap.
Figure 7:
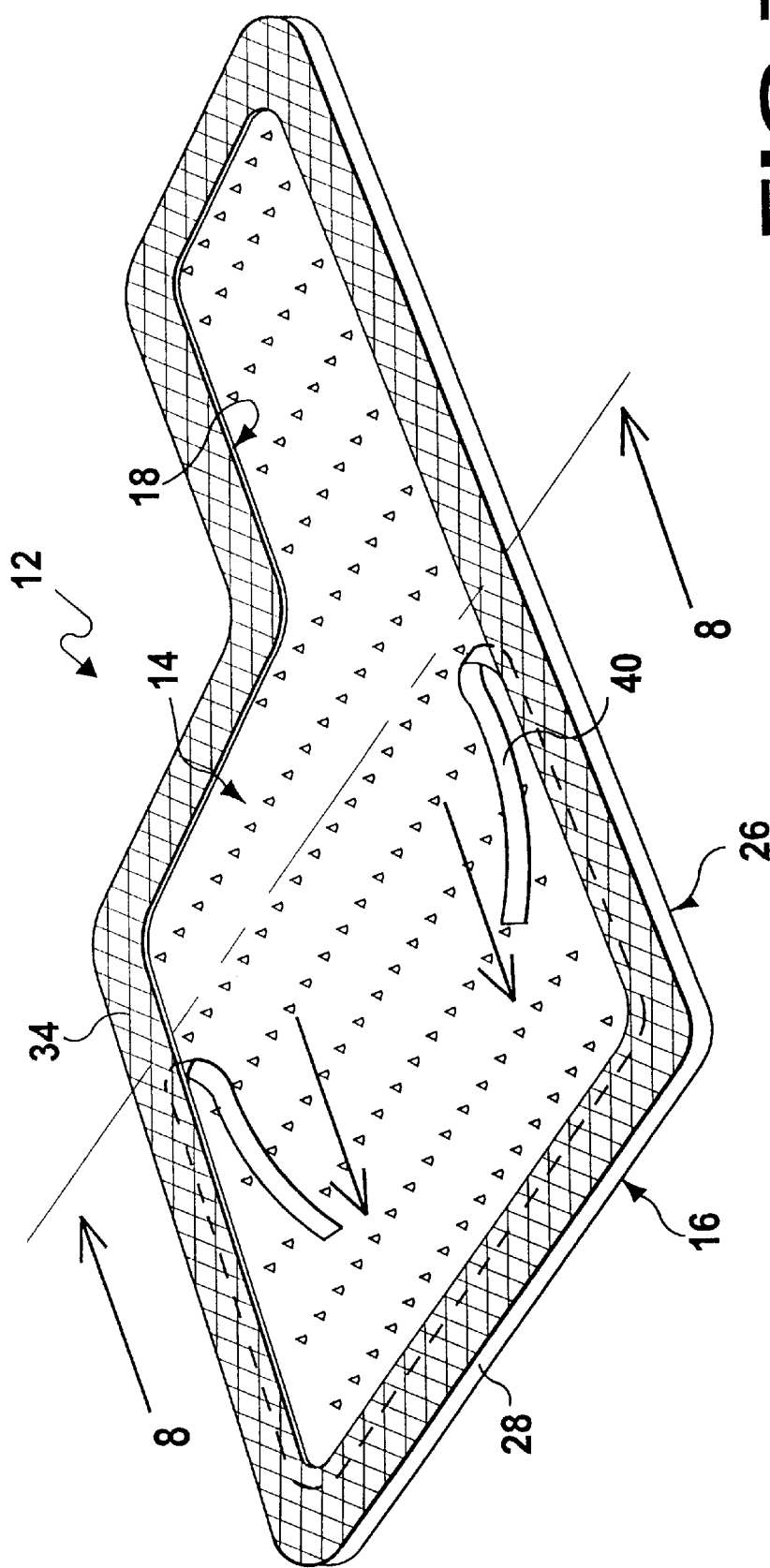
FIG. 7 is a bottom perspective view similar to FIG. 6, showing the automotive carpet mat inserted into the bottom flap and the removable paper strip being removed therefrom.
Figure 8:
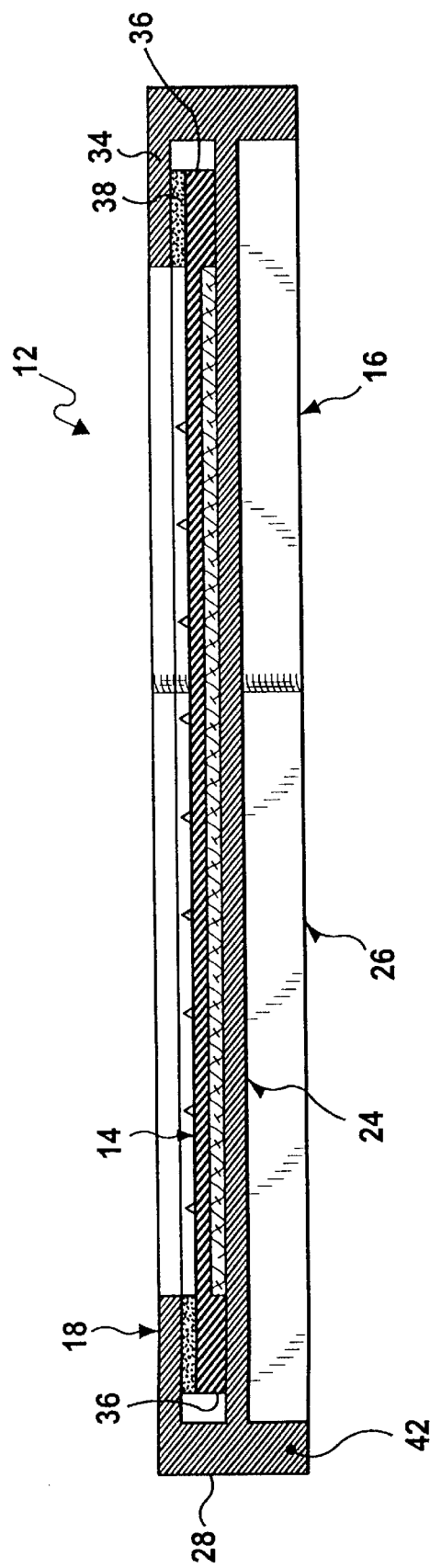
FIG. 8 is an inverted cross sectional view taken along line 8—8 in FIG. 7.

The shallow tray 16 and the bottom flap 34 are fabricated out of an optically clear pliable waterproof durable material 42. The optically clear pliable waterproof durable material 42 can be impregnated with an ultraviolet protection ingredient. As shown in FIGS. 2 and 3, a lip 44 can be integral with and extend outwardly and continuously about the bottom flap 34, to better stabilize the bottom flap 34 upon the floor 20 of the motor vehicle 22.

Figure 9:
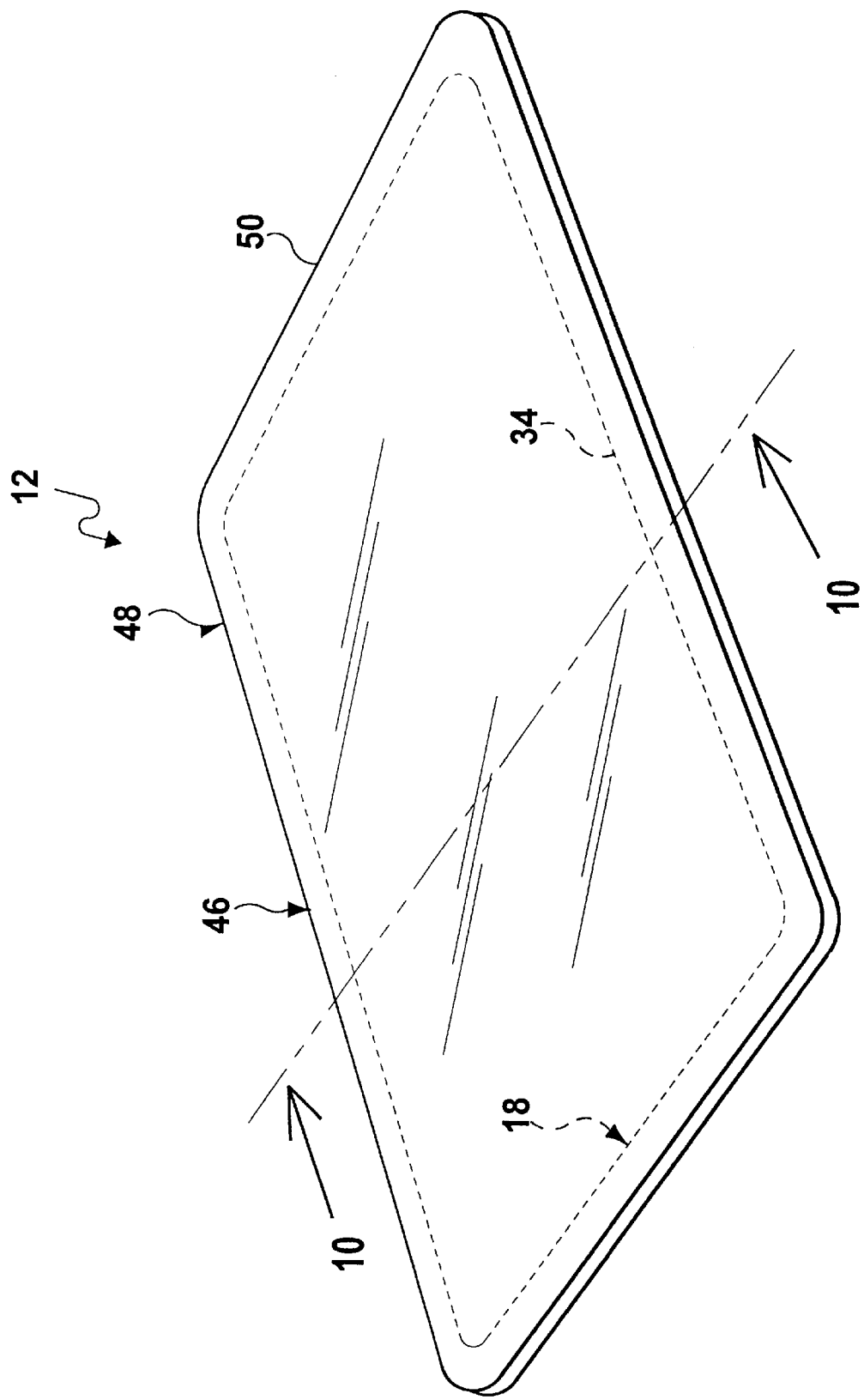
FIG. 9 is a top perspective view of a third embodiment of the present invention.
Figure 10:
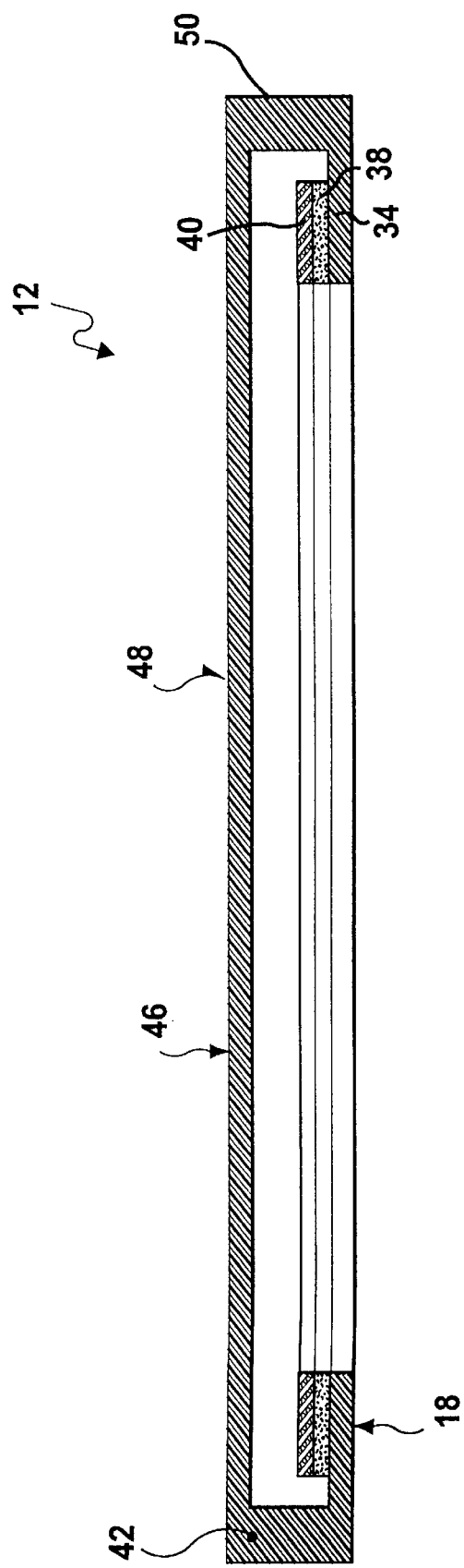
FIG. 10 is a cross sectional view taken along line 10—10 in FIG. 9.

The protective cover 12 in FIGS. 9 and 10, comprises a platform 46 sized and shaped to extend completely over the automotive carpet mat 14. The assembly 18 is for securing the platform 46 in a hermetically sealed manner to the automotive carpet mat 14, so as to preserve the automotive carpet mat 14 from dirt, wear and tear, to keep moisture out and prevent mildew, while eliminating mud, sand and liquid spills from reaching the automotive carpet mat 14 when placed upon the floor 20, in a trunk and in a cargo area of the motor vehicle 22. The platform 46 is a flexible flat plate 48.

The securing assembly 18 includes the bottom flap 34 integral with the periphery 50 of the platform 46 and extends inwardly and continuously in a spaced away parallel relationship under a bottom surface of the platform 46, whereby the edges 36 of the automotive carpet mat 14 will be inserted therebetween. The adhesive layer 38 is applied onto a top surface of the bottom flap 34. The removable paper strip 40 on the adhesive layer 38 is peeled off the adhesive layer 38 after the edges 36 of the automotive carpet mat 14 is inserted between a bottom surface of the platform 46 and the top surface of the bottom flap 34.

The platform 46 and the bottom flap 34 are fabricated out of the optically clear pliable waterproof durable material 42. The optically clear pliable waterproof durable material 42 can also be impregnated with an ultraviolet protection ingredient.

Figure 11:
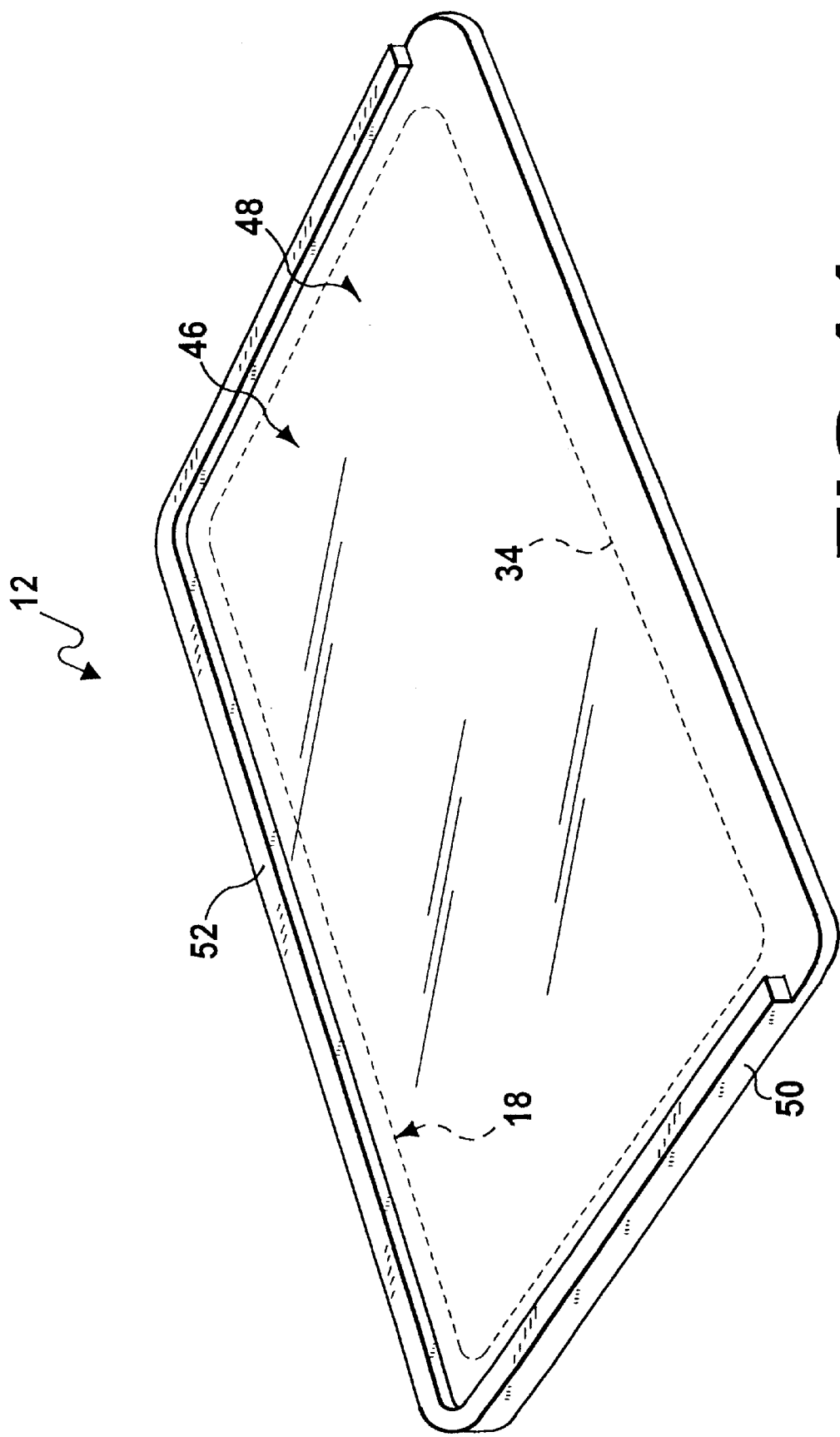
FIG. 11 is a top perspective view of a fourth embodiment of the present invention.

FIG. 11 shows a rib 52 integral with and extending upright about the periphery 59 on three sides of the platform 46, to help retain the dirt therein and still allow articles to slide onto the platform 46 past a fourth side not having the rib 52, when in the cargo area of the motor vehicle 22.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A protective cover for an automotive carpet mat comprising:
    a) a tray sized and shaped to extend completely over the automotive carpet mat; and
    b) means for securing said tray in a hermetically sealed manner to the automotive carpet mat, so as to preserve the automotive carpet mat from dirt, wear and tear, to keep moisture out and prevent mildew, while holding mud, sand and liquid spills within said tray from reaching the automotive carpet mat when placed upon a floor, in a trunk and in a cargo area of a motor vehicle, said securing means including:
        i) a bottom flap integral with the periphery of said tray and extending inwardly and continuously in a spaced away parallel relationship under a bottom surface of said tray, whereby the edges of the automotive carpet mat will be inserted therebetween;
        ii) an adhesive layer applied onto a top surface of said bottom flap; and
        iii) a removable paper strip on said adhesive layer, which is peeled off said adhesive layer after the edges of the automotive carpet mat is inserted between the bottom surface of said tray and the top surface of said bottom flap.

2. A protective cover for an automotive carpet mat as recited in claim 1, wherein said tray includes:
    a) a flat base portion; and
    b) a short wall portion integral with and extending upright and continuously adjacent the periphery of said flat base portion to retain the dirt and the liquids therein.

3. A protective cover for an automotive carpet mat as recited in claim 2, further including a plurality of raised traction thread ridges on a top surface of said flat base portion, so that when used on the floor of a driver's side of the motor vehicle, said raised traction tread ridges will provide a non-slip area for the driver's shoe heel.

4. A protective cover for an automotive carpet mat as recited in claim 1, wherein said tray and said bottom flap are fabricated out of an optically clear pliable waterproof durable material.

5. A protective cover for an automotive carpet mat as recited in claim 4, wherein said optically clear pliable waterproof durable material is impregnated with an ultraviolet protection ingredient.

6. A protective cover for an automotive carpet mat as recited in claim 1, further including a lip integral with and extending outwardly and continuously about said bottom flap, to better stabilize said bottom flap upon the floor of the motor vehicle.

7. A protective cover for an automotive carpet mat comprising:
    a) a platform sized and shaped to extend completely over the automotive carpet mat; and
    b) means for securing said platform in a hermetically sealed manner to the automotive carpet mat, so as to preserve the automotive carpet mat from dirt, wear and tear, to keep moisture out and prevent mildew, while eliminating mud, sand and liquid spills within said platform from reaching the automotive carpet mat when placed upon a floor, in a trunk and in a cargo area of a motor vehicle, said securing means including:
        i) a bottom flap integral with the periphery of said platform and extending inwardly and continuously in a spaced away parallel relationship under a bottom surface of said platform, whereby the edges of the automotive carpet mat will be inserted therebetween;
        ii) an adhesive layer applied onto a top surface of said bottom flap; and
        iii) a removable paper strip on said adhesive layer, which is peeled off said adhesive layer after the edges of the automotive carpet mat is inserted between the bottom surface of said platform and the top surface of said bottom flap.

8. A protective cover for an automotive carpet mat as recited in claim 7, wherein said platform is a flexible flat plate.

9. A protective cover for an automotive carpet mat as recited in claim 7, wherein said platform and said bottom flap are fabricated out of an optically clear pliable waterproof durable material.

10. A protective cover for an automotive carpet mat as recited in claim 9, wherein said optically clear pliable waterproof durable material is impregnated with an ultraviolet protection ingredient.

11. A protective cover for an automotive carpet mat as recited in claim 7, further including a rib integral with and extending upright about the periphery on three sides of said platform, to help retain the dirt therein and still allow articles to slide onto said platform past a fourth side not having said rib when in the cargo area of the motor vehicle.

12. A protective cover for an automotive carpet mat as recited in claim 5, further including a lip integral with and extending outwardly and continuously about said bottom flap, to better stabilize said bottom flap upon the floor of the motor vehicle.

13. A protective cover for an automotive carpet mat as recited in claim 10, further including a rib integral with and extending upright about the periphery on three sides of said platform, to help retain the dirt therein and still allow articles to slide onto said platform past a fourth side not having said rib when in the cargo area of the motor vehicle.

* * * * *